(12) United States Patent
Fan

(10) Patent No.: US 12,169,429 B2
(45) Date of Patent: Dec. 17, 2024

(54) POWER SUPPLY ABNORMALITY DETECTION CIRCUIT AND DISPLAY TERMINAL

(71) Applicants: Huizhou China Star Optoelectronics Display Co., Ltd., Huizhou (CN); Shenzhen China Star Optoelectronics Semiconductor Display Technology Co., Ltd., Shenzhen (CN)

(72) Inventor: Yue Fan, Huizhou (CN)

(73) Assignees: Huizhou China Star Optoelectronics Display Co., Ltd., Huizhou (CN); Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 214 days.

(21) Appl. No.: 17/876,150

(22) Filed: Jul. 28, 2022

(65) Prior Publication Data
US 2024/0028096 A1   Jan. 25, 2024

(30) Foreign Application Priority Data
Jul. 19, 2022   (CN) .......................... 202210849800.5

(51) Int. Cl.
*G09G 5/00*   (2006.01)
*G06F 1/28*   (2006.01)
*G09G 3/00*   (2006.01)

(52) U.S. Cl.
CPC ............... *G06F 1/28* (2013.01); *G09G 3/006* (2013.01); *G09G 2330/12* (2013.01)

(58) Field of Classification Search
CPC .... G09G 3/006; G09G 3/20; G09G 2330/021; G09G 2330/023; G09G 2330/045; G09G 2330/12; G06F 1/28; G01R 19/16538; G01R 31/40; H02H 7/12; H02H 7/13; H02M 1/0048
See application file for complete search history.

(56) References Cited

U.S. PATENT DOCUMENTS

| | | | |
|---|---|---|---|
| 6,785,106 B2* | 8/2004 | Nagata ............... | G01R 31/2884 361/86 |
| 7,504,743 B2* | 3/2009 | Matsumoto .......... | G01R 31/006 361/87 |
| 8,575,978 B2* | 11/2013 | Komatsu .......... | H03K 19/00361 327/143 |
| 9,058,773 B2* | 6/2015 | Park ..................... | G09G 3/3233 |

(Continued)

FOREIGN PATENT DOCUMENTS

JP   6392585 B2 *   9/2018

*Primary Examiner* — Joe H Cheng

(57) ABSTRACT

The present application relates to a power supply abnormality detection circuit and a display terminal, where the circuit includes a power supply conversion module for converting an input power supply into an output power supply; a comparison module for comparing a current output power supply with a preset reference power supply to obtain a first comparison signal; a control module for generating a control signal based on the first comparison signal; and a power supply management module for determining a first operation state corresponding to normality of the output power supply and a second operation state corresponding to abnormality of the output power supply based on the control signal.

17 Claims, 3 Drawing Sheets

(56) References Cited

U.S. PATENT DOCUMENTS

| | | | | |
|---|---|---|---|---|
| 9,797,945 | B2* | 10/2017 | Yamamoto | G01R 31/3004 |
| 11,156,672 | B2* | 10/2021 | Nakamura | G01R 31/2812 |
| 11,308,835 | B2* | 4/2022 | Lee | G09G 3/20 |
| 11,605,327 | B2* | 3/2023 | Lee | G09G 3/20 |
| 2018/0108308 | A1* | 4/2018 | Cao | G09G 3/3696 |
| 2018/0196105 | A1* | 7/2018 | Inukai | G01R 35/00 |
| 2018/0212513 | A1* | 7/2018 | Park | H02M 3/156 |

\* cited by examiner

POWER SUPPLY ABNORMALITY DETECTION CIRCUIT AND DISPLAY TERMINAL

RELATED APPLICATION

This application claims the benefit of priority of China Patent Application No. 202210849800.5 filed on Jul. 19, 2022, the disclosure of which is incorporated by reference as if fully set forth herein in its entirety.

TECHNICAL FIELD

The present application relates to the field of display technology, and more particularly to a power supply abnormality detection circuit and a display terminal.

BACKGROUND

In the related art, a buck chip (i.e. Buck IC) may be used in a driving circuit of a display panel to convert an input power supply into an output power supply having a lower voltage value. Specifically, the output power supply of the buck chip is strongly correlated with a duty ratio (i.e. Ton) of an internal control signal of the buck chip. The output power supply of the buck chip can be adjusted by changing the duty ratio of the internal control signal of the buck chip.

However, when the buck chip is disturbed by the external environment, an internal circuit of the buck chip is in an abnormal state, which causes the duty ratio in the buck chip to be unstable and the output power supply to be too high. However, when the output power supply is too high, it will exceed the voltage specification of a back-end circuit, which may cause the components of the related circuit to be burned.

SUMMARY

In view of the above, the present application provides a power supply abnormality detection circuit and a display terminal, which can switch a power supply management module to a second operation state in time when an abnormal output power supply output by a power supply conversion module occurs, thereby closing the output power supply. As a result, a risk of circuit damage is reduced so as to improve safety while reducing circuit loss and cost.

According to one aspect of the present application, there is provided a power supply abnormality detection circuit comprising a power supply conversion module for converting an input power supply into an output power supply; a comparison module electrically connected to the power supply conversion module, wherein the comparison module is configured to compare a current output power supply with a preset reference power supply to obtain a first comparison signal; a control module electrically connected to the comparison module, wherein the control module is configured to generate a control signal based on the first comparison signal; and a power supply management module electrically connected to the control module, wherein the power supply management module is configured to determine a first operation state corresponding to normality of the output power supply and a second operation state corresponding to abnormality of the output power supply based on the control signal.

Further, the comparison module further comprises a first comparator including a first input positive terminal, a first input negative terminal, and a first output terminal, wherein the first input positive terminal is electrically connected to the power supply conversion module to receive an output power supply of the power supply conversion module; the first input negative terminal is configured to receive a preset reference power supply; and the first output terminal is electrically connected to the control module to output the first comparison signal.

Further, the control module further comprises a first transistor, wherein a first terminal of the first transistor is electrically connected to the first output terminal to receive the first comparison signal; a second terminal of the first transistor is grounded; and a third terminal of the first transistor is electrically connected to the power supply management module to output the control signal.

Further, the power supply management module comprises a power supply management chip provided with an enable pin, wherein the enable pin is electrically connected to the third terminal of the first transistor to receive the control signal.

Further, the first operation state is a power-on state, and the second operation state is a power-off state, wherein, in the case where the output power supply is normal, the control signal controls the enable pin to be disabled and the power supply management module controls the output power supply to be turned on; and in the case where the output power supply is abnormal, the control signal controls the enable pin to be enabled, and the power supply management module controls the output power supply to be turned off.

Further, the power supply conversion module further comprises a current mirror unit including a first current source, a second current source, a resistor, and a capacitor, wherein one terminal of the first current source is electrically connected to a preset first preset voltage, the other terminal of the first current source is electrically connected to one terminal of the resistor, and the other terminal of the resistor is grounded; and one terminal of the second current source is electrically connected to a second preset voltage, the other terminal of the second current source is electrically connected to one terminal of the capacitor, and the other terminal of the capacitor is grounded.

Further, the power supply conversion module further comprises a second comparator including a second input positive terminal, a second input negative terminal, and a second output terminal, the second comparator being configured to generate a second comparison signal based on a voltage across the capacitor, wherein the second input positive terminal is electrically connected to a preset third preset voltage; the second input negative terminal is electrically connected to one terminal of the capacitor; and the second output is configured to output the second comparison signal.

Further, the power supply conversion module further comprises a second transistor, wherein a first terminal of the second transistor is electrically connected to the second output terminal to receive the second comparison signal; a second terminal of the second transistor is electrically connected to the comparison module to output the output power supply; and a third terminal of the second transistor is configured to receive the input power supply.

Further, the power supply conversion module is a buck module, wherein the output power supply is associated with a duty cycle of the second comparison signal, and the duty cycle of the second comparison signal is associated with a current flowing through the resistor.

According to another aspect of the present application, there is provided a display terminal comprising a display panel and the power supply abnormality detection circuit, wherein the power supply abnormality detection circuit is connected to the display panel.

By setting the comparison module for comparing the current output power supply with the preset reference power supply to obtain the first comparison signal and setting the control module for generating the control signal based on the first comparison signal, the first operation state and the second operation state respectively corresponding to the output power supply normality state and the output power supply abnormality state are finally determined based on the control signal. According to various aspects of the present application, when the output power supply output by the power supply conversion module is abnormal, the power supply management module can be switched to the second operation state in time, thereby closing the output power supply. As a result, a risk of circuit damage is reduced to improve safety while reducing circuit loss and cost.

BRIEF DESCRIPTION OF THE DRAWINGS

Technical solutions and other beneficial effects of the present application are apparent below from detailed description of the embodiments of the present application in combination with the accompanying drawings.

EMBODIMENTS OF THE PRESENT DISCLOSURE

Figure 1:
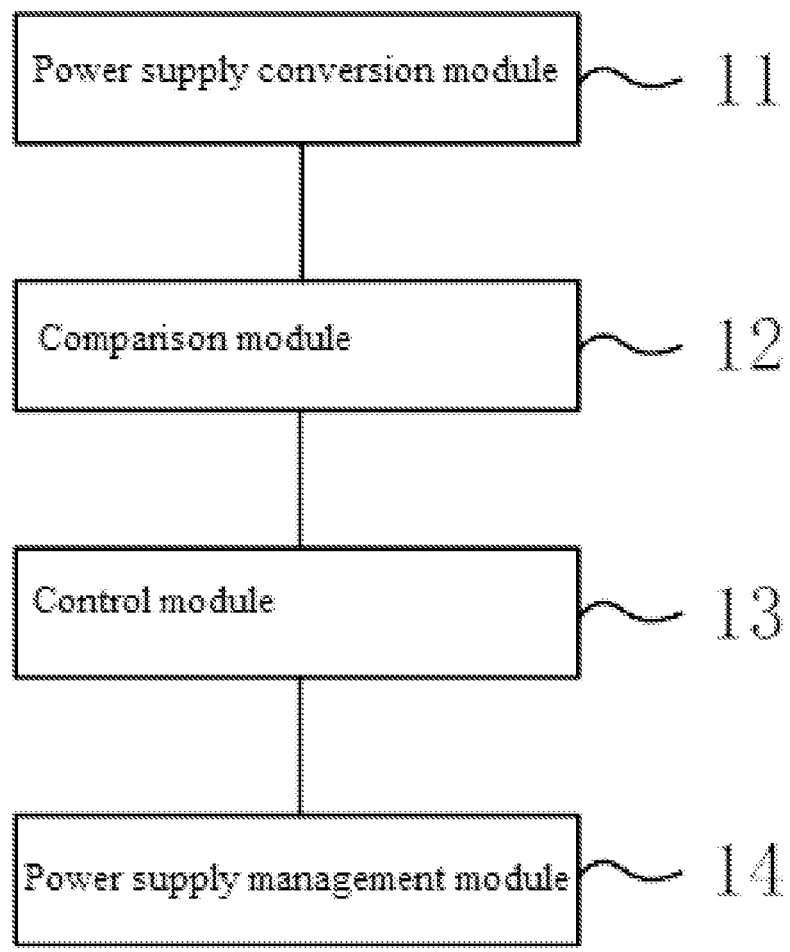
FIG. 1 shows a schematic diagram of a principle of a power supply abnormality detection circuit according to an embodiment of the present application.

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application.

In the description of the present application, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present application, rather than indicate or imply that the devices or elements referred to herein are required to have specific orientations or be constructed or operate in the specific orientations. Accordingly, the terms should not be construed as limiting the present application. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present application, the meaning of "plural" is two or more, unless otherwise specifically defined.

In the description of the present application, it should be noted that unless otherwise clearly defined and limited, the terms "mounted", "connected/coupled", and "connection" should be interpreted broadly. For example, the terms may refer to a fixed connection, a detachable connection, or an integral connection; the terms may also refer to a mechanical connection, an electrical connection, or communication with each other; the terms may further refer to a direct connection, an indirect connection through an intermediary, or an interconnection between two elements or interactive relationship between two elements. Those ordinary skilled in the art can understand the specific meanings of the above terms in the present application according to specific situations.

The following description provides various embodiments or examples for implementing various structures of the present application. To simplify the description of the present application, parts and settings of specific examples are described as follows. Certainly, they are only illustrative, and are not intended to limit the present application. Further, reference numerals and reference letters may be repeated in different examples. This repetition is for purposes of simplicity and clarity and does not indicate a relationship of the various embodiments and/or the settings. Furthermore, the present application provides specific examples of various processes and materials, however, applications of other processes and/or other materials may be appreciated those skilled in the art. In some instances, methods, means, elements, and circuits known to those skilled in the art are not described in detail in order to highlight the subject matter of the present application.

The present application mainly provides a power supply abnormality detection circuit comprising a power supply conversion module for converting an input power supply into an output power supply; a comparison module electrically connected to the power supply conversion module, wherein the comparison module is configured to compare a current output power supply with a preset reference power supply to obtain a first comparison signal; a control module electrically connected to the comparison module, wherein the control module is configured to generate a control signal based on the first comparison signal; and a power supply management module electrically connected to the control module, wherein the power supply management module is configured to determine a first operation state corresponding to normality of the output power supply and a second operation state corresponding to abnormality of the output power supply based on the control signal.

By setting the comparison module for comparing the current output power supply with the preset reference power supply to obtain the first comparison signal and setting the control module for generating the control signal based on the first comparison signal, the first operation state and the second operation state respectively corresponding to the output power supply normality state and the output power supply abnormality state are finally determined based on the control signal. The present application can switch the power supply management module to the second operation state in time when the output power supply output by the power supply conversion module is abnormal, thereby closing the output power supply. As a result, a risk of circuit damage is reduced to improve safety while reducing circuit loss and cost.

FIG. 1 shows a schematic diagram of a principle of a power supply abnormality detection circuit according to an embodiment of the present application.

As shown in FIG. 1, the power supply abnormality detection circuit of the present application may include a power supply conversion module 11, a comparison module 12, a control module 13, and a power supply management module 14. The power supply conversion module 11, the comparison module 12, the control module 13, and the power supply management module 14 are electrically connected in sequence. Illustratively, the power supply abnormality detection circuit may be used in a driving circuit of a display panel. It should be understood in the present application that the technical solutions of the present application can be utilized in all application scenarios in which a power supply conversion process exists, and the present application does not limit the specific application scenario of the power supply abnormality detection circuit.

The power supply conversion module is configured to convert an input power supply into an output power supply. The input power supply may be a power supply directly input from the outside of the power supply abnormality detection circuit, or may be a power supply of another power supply module in the driving circuit of the display panel; and the output power supply may be a power supply obtained after the input power supply passes through the power supply conversion module, and the output power supply may be output to a subsequent circuit such as a gamma adjustment module so as to provide a sufficient power for the subsequent circuit.

Figure 2:
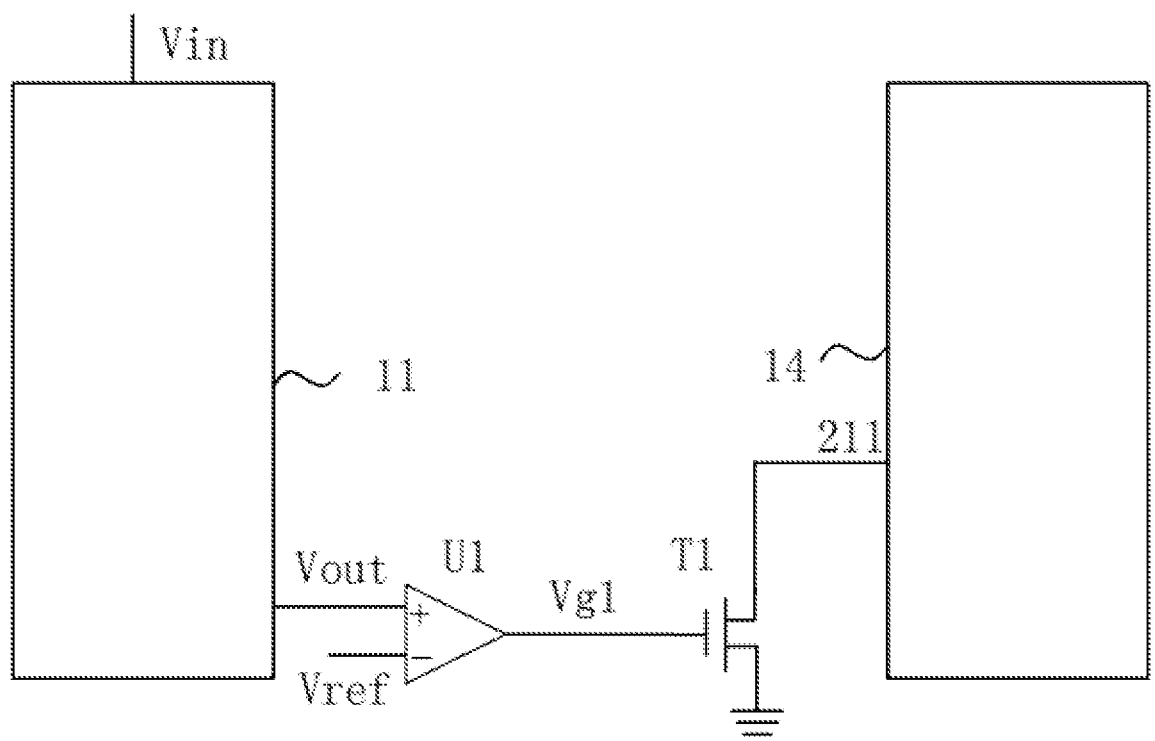
FIG. 2 shows a schematic diagram of a structure of a power supply abnormality detection circuit according to an embodiment of the present application.

FIG. 2 shows a schematic diagram of a structure of a power supply abnormality detection circuit according to an embodiment of the present application.

As shown in FIG. 2, the power supply abnormality detection circuit of the present application may include a power supply conversion module 11, a comparison module, a control module, and a power supply management module 14. The power supply conversion module 11 can be configured to convert an input power supply Vin into an output power supply Vout.

Further, the comparison module further comprises a first comparator including a first input positive terminal, a first input negative terminal, and a first output terminal, wherein the first input positive terminal is electrically connected to the power supply conversion module to receive an output power supply of the power supply conversion module; the first input negative terminal is configured to receive a preset reference power supply; and the first output terminal is electrically connected to the control module to output the first comparison signal.

Referring to FIG. 2, the comparison module may be electrically connected to the power supply conversion module 11 and include a first comparator U1. A first input positive terminal of the first comparator U1 is electrically connected to the power supply conversion module 11 to receive the output power supply Vout of the power supply conversion module 11; a first input negative terminal of the first comparator U1 is configured to receive a preset reference power supply Vref; and a first output terminal of the first comparator U1 is electrically connected to the control module to output a first comparison signal Vg1.

Further, the control module further comprises a first transistor, wherein a first terminal of the first transistor is electrically connected to the first output terminal to receive the first comparison signal; a second terminal of the first transistor is grounded; and a third terminal of the first transistor is electrically connected to the power supply management module to output the control signal.

For example, in FIG. 2, the control module may include a first transistor T1. A first terminal of the first transistor T1 is electrically connected to a first output terminal of the first comparator U1 to receive a first comparison signal Vg1; a second terminal of the first transistor T1 may be grounded; and a third terminal of the first transistor T1 may be electrically connected to the power supply management module 14 to output the control signal to the power supply management module 14.

Further, the power supply management module comprises a power supply management chip provided with an enable pin, where the enable pin is electrically connected to the third terminal of the first transistor to receive the control signal.

With respect to FIG. 2, the power supply management module may be implemented with a power supply management chip (PMIC). The power supply management chip may be provided with an enable pin 211. In the case where the enable pin 211 is enabled, the power supply management chip may control the output power supply Vout to be turned on, and the subsequent circuit works. In the case where the enable pin 211 is disabled, the power supply management chip may control the output power supply Vout to be turned off, and the subsequent stage circuit does not work.

Further, the first operation state is a power-on state, and the second operation state is a power-off state. In the case where the output power supply is normal, the control signal controls the enable pin to be disabled and the power supply management module controls the output power supply to be turned on; and in the case where the output power supply is abnormal, the control signal controls the enable pin to be enabled, and the power supply management module controls the output power supply to be turned off.

In FIG. 2, the comparison module 12 may compare a current output power supply Vout with the preset reference power supply Vref to obtain a first comparison signal. Illustratively, the reference power supply may be 3.3 V. In the case where the current output power supply is larger than the reference power supply, the first comparison signal may be a high level signal, so that the first transistor T1 is turned on, the enable pin 211 is enabled, and the output power supply Vout is turned on; and in the case where the current output power supply is less than or equal to the reference power supply, the first comparison signal may be a low level signal, so that the first transistor T1 is turned off, the enable pin 211 is disabled, and the output power supply Vout is turned off.

Further, the power supply conversion module is a buck module. For example, the input power supply may be 12V, the output power supply may be 1.8V, and the power supply conversion module converts 12V to 1.8V. Of course, in the present application, the power supply conversion module may be a boost module, and the present application is not limited to the type of the power supply conversion module. Hereinafter, an example in which the power supply conversion module is used as the buck module is taken in the present application.

Further, the power supply conversion module further comprises a current mirror unit including a first current source, a second current source, a resistor, and a capacitor, wherein one terminal of the first current source is electrically connected to a preset first preset voltage, the other terminal of the first current source is electrically connected to one terminal of the resistor, and the other terminal of the resistor is grounded; and one terminal of the second current source is electrically connected to a second preset voltage, the other terminal of the second current source is electrically connected to one terminal of the capacitor, and the other terminal of the capacitor is grounded.

Figure 3:
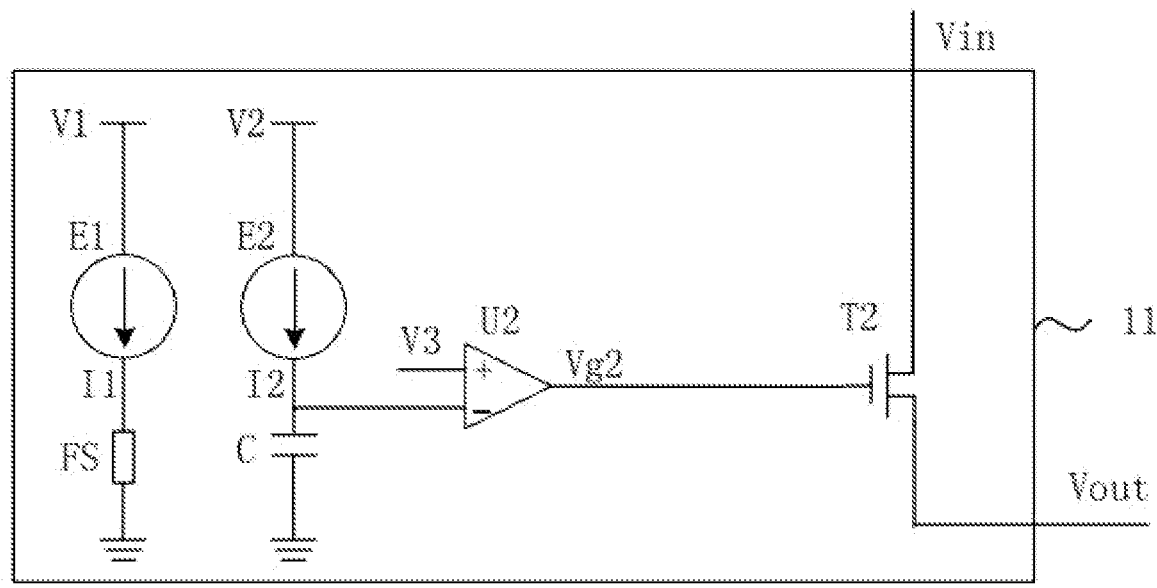
FIG. 3 shows a schematic diagram of a structure of a power supply conversion module according to an embodiment of the present application.

FIG. 3 shows a schematic diagram of a structure of a power supply conversion module according to an embodiment of the present application.

As shown in FIG. 3, the current mirror unit of the embodiment of the present application may include a first current source E1, a second current source E2, a resistor FS, and a capacitor C. One terminal of the first current source E1 is electrically connected to the first preset voltage V1, the other terminal of the first current source E1 is electrically connected to one terminal of the resistor FS, and the other terminal of the resistor FS is grounded; and one terminal of the second current source E2 is electrically connected to the second preset voltage V2, the other terminal of the second current source E2 is electrically connected to one terminal of the capacitor C, and the other terminal of the capacitor C is grounded. The first preset voltage V1 and the second preset voltage V2 may be set in advance and freely adjustable according to actual conditions.

In FIG. 3, the current I1 of the first current source E1 flows through a branch where the resistor FS is located, and the current I2 of the second current source E2 flows through a branch where the capacitor C is located. For example, I1=0.6/RFS, where 0.6V may be the magnitude of the first preset voltage V1, and RFS may be the resistance value of the resistor FS, i.e., the magnitude of the current I1 may be adjusted by adjusting the resistance value of the resistor FS.

Further, the current I2 is a mirror of the current I1, and the current I2 may be several times the current I1. Illustratively, the current I2 is equal in magnitude to the current I1. The current I2 charges capacitor C to form a voltage across capacitor C.

Further, the power supply conversion module further comprises a second comparator including a second input positive terminal, a second input negative terminal, and a second output terminal, the second comparator being configured to generate a second comparison signal based on a voltage across the capacitor, wherein the second input positive terminal is electrically connected to a preset third preset voltage; the second input negative terminal is electrically connected to one terminal of the capacitor; and the second output is configured to output the second comparison signal.

Referring to FIG. 3, the power supply conversion module 11 of the embodiment of the present application may further include a second comparator U2. The second input positive terminal of the second comparator U2 may be electrically connected to a preset third preset voltage V3, and the second input negative terminal of the second comparator U2 may be electrically connected to one terminal of the capacitor C. That is, the second comparator can compare the voltage across the capacitor C with the magnitude of the third preset voltage V3, and generate a second comparison signal Vg2. For example, in the case where the voltage across the capacitor C is greater than the third preset voltage, the second comparison signal may be a high level signal; and in the case where the voltage across the capacitor C is less than the third preset voltage, the second comparison signal may be a low level signal.

In one example, the second comparison signal may be a periodic signal, such as a Pulse Width Modulation (PWM) signal. In one period of the second comparison signal, the ratio of the duration of the high level signal to the total duration of the period may be a duty cycle of the second comparison signal in the period. Since the current I2 is a mirror of the current I1, the value of the current I1 can be adjusted by adjusting the resistance value of the resistor FS, and then the value of the current I2 can be adjusted to change the voltage across the capacitor, thereby adjusting the duty ratio of the second comparison signal.

Further, the power supply conversion module further comprises a second transistor, wherein a first terminal of the second transistor is electrically connected to the second output terminal to receive the second comparison signal; a second terminal of the second transistor is electrically connected to the comparison module to output the output power supply; and a third terminal of the second transistor is configured to receive the input power supply.

With respect to FIG. 3, the power supply conversion module may further include a second transistor T2. The first terminal of the second transistor T2 may be electrically connected to the second output terminal of the comparator U2 to receive the second comparison signal Vg2; a second terminal of the second transistor T2 may be configured to output the output power supply Vout, e.g., 1.8V; and the third terminal of the second transistor T2 may be configured to receive an input power supply Vin, e.g., 12V.

It should be noted that any of the transistors of the present application may be either N-type or P-type. For example, in the case where the first transistor is N-type, the first terminal of the first transistor may be a gate of the first transistor, the second terminal of the first transistor may be a source of the transistor, and the third terminal of the first transistor may be a drain of the transistor; and in the case where the first transistor is P-type, the first terminal of the first transistor may be the gate of the first transistor, the second terminal of the first transistor may be the drain of the transistor, and the third terminal of the first transistor may be the source of the transistor.

Also, in the case where the second transistor is N-type, the first terminal of the second transistor may be a gate of the second transistor, the second terminal of the second transistor may be a source of the transistor, and the third terminal of the second transistor may be a drain of the transistor; and in the case where the second transistor is P-type, the first terminal of the second transistor may be the gate of the second transistor, the second terminal of the second transistor may be the drain of the transistor, and the third terminal of the second transistor may be the source of the transistor.

Further, the output power supply is associated with a duty cycle of the second comparison signal, and the duty cycle of the second comparison signal is associated with a current flowing through the resistor. For example, in FIG. 3, when the current flowing through the resistor FS is I1, the change of the current I1 affects the duty ratio of the second comparison signal Vg2, and the turn-on time Ton of the second transistor T2 can be adjusted by adjusting the duty ratio of the second comparison signal Vg2, thereby changing the magnitude of the output power supply. In one example, the duty ratio is equal to Vout/Vin and less than 1, i.e., Vout is less than Vin, thereby enabling the power supply conversion module to perform a buck function.

It should be noted that, in FIG. 3, other than the current mirror unit, the second comparator, and the second transistor, the power supply conversion module 11 may include additional power supply circuits, such as a low-pass filter circuit. It can be understood by those skilled in the art that conventional power supply conversion circuits may be implemented according to actual requirements, and the present application does not limit the specific implementation of the power supply conversion module.

Figure 4:
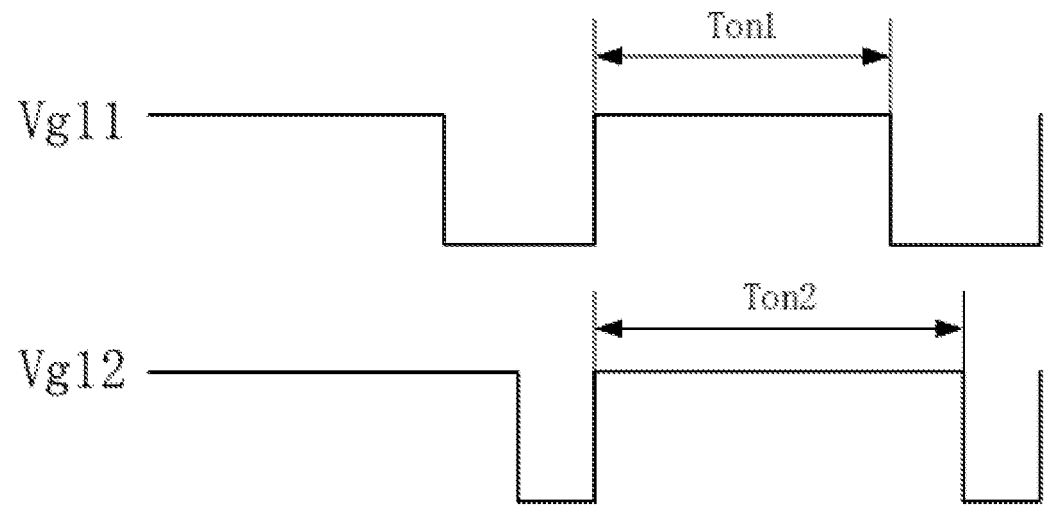
FIG. 4 shows a schematic diagram of a second comparison signal according to an embodiment of the present application.

FIG. 4 shows a schematic diagram of a second comparison signal according to an embodiment of the present application.

As shown in FIG. 4, Vg11 may be a second comparison signal when the output power supply is in a normal state, and Vg12 may be a second comparison signal when the output power supply is in an abnormal state. It can be seen that the duty ratio of the second comparison signal in the normal state (i.e., the percentage of the high level Ton1 to the period) is different from the duty ratio of the second comparison signal in the abnormal state (i.e., the percentage of the high level Ton2 to the period).

For example, when the resistor FS in FIG. 3 is disturbed by an external environment (e.g., human body contact, temperature or humidity change, etc.) so that the resistor FS changes, the current I1 flowing through the resistor FS changes, and then the ratio I1/I2 of the current I1 to the current I2 changes, thereby affecting the duty ratio, and finally affecting the output power supply of the power supply conversion module. In practical operation, the output power supply may drift from 1.8 V to 7V-8 V, which exceeds the specifications of the back-end circuit components. Therefore, there is a great safety risk, which causes damage to the back-end components and increases the product loss.

Therefore, by setting the comparison module and control module, the present application can start the protection mechanism in time when the abnormality of the output power supply is detected, thereby avoiding the damage of the back-end components, reducing the safety risk, and reducing the loss while saving the cost. It should be noted that the detection object of the present application is an output power supply. Based on the inventive concept of the present application, other parameters such as the current of the resistor FS (i.e., I1) or the temperature of the power supply conversion chip can be detected, and the purpose of starting the protection mechanism can be achieved by judging whether the other parameters are abnormal. It may be understood that the present application is not limited to the specific object of detection.

Additionally, the present application further provides a display terminal comprising a display panel and the power supply abnormality detection circuit, where the power supply abnormality detection circuit is connected to the display panel.

In view of the foregoing, by setting the comparison module for comparing the current output power supply with the preset reference power supply to obtain the first comparison signal and setting the control module for generating the control signal based on the first comparison signal, the embodiments of the present application finally determines the first operation state and the second operation state respectively corresponding to the output power supply normality state and the output power supply abnormality state based on the control signal. The power supply management module can be switched to the second operation state in time when the output power supply output by the power supply conversion module is abnormal, thereby closing the output power supply. As a result, a risk of circuit damage is reduced to improve safety while reducing circuit loss and cost.

In the above embodiments, the description of each embodiment has its own emphasis. A portion that is not described in detail in an embodiment may refer to related descriptions in another embodiment.

The power supply abnormality detection circuit and the display terminal provided in the embodiments of the present disclosure are described in detail above. In this specification, principles and implementations of the present disclosure are illustrated by applying specific examples herein. The description of the above embodiments is only used to help understand the technical solutions and core ideas of the present disclosure; those of ordinary skill in the art should understand that it is still possible to modify the technical solutions recorded in the foregoing embodiments, and these modifications or replacements do not cause the essence of the corresponding technical solutions to deviate from the scope of the technical solutions of the embodiments of the present disclosure.

What is claimed is:

1. A power supply abnormality detection circuit, comprising:
    a power supply conversion module for converting an input power supply into an output power supply;
    a comparison module electrically connected to the power supply conversion module, wherein the comparison module is configured to compare a current output power supply with a preset reference power supply to obtain a first comparison signal;
    a control module electrically connected to the comparison module, wherein the control module is configured to generate a control signal based on the first comparison signal; and
    a power supply management module electrically connected to the control module, wherein the power supply management module is configured to determine a first operation state corresponding to normality of the output power supply and a second operation state corresponding to abnormality of the output power supply based on the control signal;
    wherein the power supply conversion module further comprises a current mirror unit including a first current source, a second current source, a resistor, and a capacitor, wherein:
    one terminal of the first current source is electrically connected to a first preset voltage, the other terminal of the first current source is electrically connected to one terminal of the resistor, and the other terminal of the resistor is grounded; and
    one terminal of the second current source is electrically connected to a second preset voltage, the other terminal of the second current source is electrically connected to one terminal of the capacitor, and the other terminal of the capacitor is grounded.

2. The power supply abnormality detection circuit of claim 1, wherein the comparison module further comprises a first comparator including a first input positive terminal, a first input negative terminal, and a first output terminal, wherein:
    the first input positive terminal is electrically connected to the power supply conversion module to receive an output power supply of the power supply conversion module;
    the first input negative terminal is configured to receive a preset reference power supply; and
    the first output terminal is electrically connected to the control module to output the first comparison signal.

3. The power supply abnormality detection circuit of claim 2, wherein the control module further comprises a first transistor, wherein:
    a first terminal of the first transistor is electrically connected to the first output terminal to receive the first comparison signal;
    a second terminal of the first transistor is grounded; and a third terminal of the first transistor is electrically connected to the power supply management module to output the control signal.

4. The power supply abnormality detection circuit of claim 3, wherein the power supply management module comprises a power supply management chip provided with an enable pin, wherein the enable pin is electrically connected to the third terminal of the first transistor to receive the control signal.

5. The power supply abnormality detection circuit of claim 4, wherein the first operation state is a power-on state, and the second operation state is a power-off state, wherein:
in the case where the output power supply is normal, the control signal controls the enable pin to be disabled and the power supply management module controls the output power supply to be turned on; and
in the case where the output power supply is abnormal, the control signal controls the enable pin to be enabled, and the power supply management module controls the output power supply to be turned off.

6. The power supply abnormality detection circuit of claim 1, wherein the power supply conversion module further comprises a second comparator including a second input positive terminal, a second input negative terminal, and a second output terminal, the second comparator being configured to generate a second comparison signal based on a voltage across the capacitor, wherein:
the second input positive terminal is electrically connected to a third preset voltage;
the second input negative terminal is electrically connected to one terminal of the capacitor; and
the second output terminal is configured to output the second comparison signal.

7. The power supply abnormality detection circuit of claim 6, wherein the power supply conversion module further comprises a second transistor, wherein:
a first terminal of the second transistor is electrically connected to the second output terminal to receive the second comparison signal;
a second terminal of the second transistor is electrically connected to the comparison module to output the output power supply; and
a third terminal of the second transistor is configured to receive the input power supply.

8. The power supply abnormality detection circuit of claim 1, wherein the power supply conversion module is a buck module, and wherein the output power supply is associated with a duty cycle of the second comparison signal, and the duty cycle of the second comparison signal is associated with a current flowing through the resistor.

9. A display terminal, comprising a display panel and a power supply abnormality detection circuit, wherein the power supply abnormality detection circuit comprises:
a power supply conversion module for converting an input power supply into an output power supply;
a comparison module electrically connected to the power supply conversion module, wherein the comparison module is configured to compare a current output power supply with a preset reference power supply to obtain a first comparison signal;
a control module electrically connected to the comparison module, wherein the control module is configured to generate a control signal based on the first comparison signal; and
a power supply management module electrically connected to the control module, wherein the power supply management module is configured to determine a first operation state corresponding to normality of the output power supply and a second operation state corresponding to abnormality of the output power supply based on the control signal,
wherein the power supply abnormality detection circuit is connected to the display panel,
wherein the power supply conversion module further comprises a current mirror unit including a first current source, a second current source, a resistor, and a capacitor, wherein:
one terminal of the first current source is electrically connected to a first preset voltage, the other terminal of the first current source is electrically connected to one terminal of the resistor, and the other terminal of the resistor is grounded; and
one terminal of the second current source is electrically connected to a second preset voltage, the other terminal of the second current source is electrically connected to one terminal of the capacitor, and the other terminal of the capacitor is grounded.

10. The display terminal of claim 9, wherein the comparison module further comprises a first comparator including a first input positive terminal, a first input negative terminal, and a first output terminal, wherein:
the first input positive terminal is electrically connected to the power supply conversion module to receive an output power supply of the power supply conversion module;
the first input negative terminal is configured to receive a preset reference power supply; and
the first output terminal is electrically connected to the control module to output the first comparison signal.

11. The display terminal of claim 10, wherein the control module further comprises a first transistor, wherein:
a first terminal of the first transistor is electrically connected to the first output terminal to receive the first comparison signal;
a second terminal of the first transistor is grounded; and
a third terminal of the first transistor is electrically connected to the power supply management module to output the control signal.

12. The display terminal of claim 11, wherein the power supply management module comprises a power supply management chip provided with an enable pin, wherein the enable pin is electrically connected to the third terminal of the first transistor to receive the control signal.

13. The display terminal of claim 12, wherein the first operation state is a power-on state, and the second operation state is a power-off state, wherein:
in the case where the output power supply is normal, the control signal controls the enable pin to be disabled and the power supply management module controls the output power supply to be turned on; and
in the case where the output power supply is abnormal, the control signal controls the enable pin to be enabled, and the power supply management module controls the output power supply to be turned off.

14. The display terminal of claim 9, wherein the power supply conversion module further comprises a second comparator including a second input positive terminal, a second input negative terminal, and a second output terminal, the second comparator being configured to generate a second comparison signal based on a voltage across the capacitor, wherein:
the second input positive terminal is electrically connected to a third preset voltage;

the second input negative terminal is electrically connected to one terminal of the capacitor; and the second output terminal is configured to output the second comparison signal.

15. The display terminal of claim 14, wherein the power supply conversion module further comprises a second transistor, wherein:
- a first terminal of the second transistor is electrically connected to the second output terminal to receive the second comparison signal;
- a second terminal of the second transistor is electrically connected to the comparison module to output the output power supply; and
- a third terminal of the second transistor is configured to receive the input power supply.

16. The display terminal of claim 9, wherein the power supply conversion module is a buck module, and wherein the output power supply is associated with a duty cycle of the second comparison signal, and the duty cycle of the second comparison signal is associated with a current flowing through the resistor.

17. A power supply abnormality detection circuit, comprising:
- a power supply conversion module for converting an input power supply into an output power supply;
- a comparison module electrically connected to the power supply conversion module, wherein the comparison module is configured to compare a current output power supply with a preset reference power supply to obtain a first comparison signal;
- a control module electrically connected to the comparison module, wherein the control module is configured to generate a control signal based on the first comparison signal; and
- a power supply management module electrically connected to the control module, wherein the power supply management module is configured to determine a first operation state corresponding to normality of the output power supply and a second operation state corresponding to abnormality of the output power supply based on the control signal;

wherein the power supply conversion module is a buck module, and wherein the output power supply is associated with a duty cycle of the second comparison signal, and the duty cycle of the second comparison signal is associated with a current flowing through the resistor.

* * * * *